Feb. 6, 1945. F. R. FELCHER 2,368,816
APPARATUS FOR MAKING ARTIFICIAL TEETH
Filed Sept. 4, 1942 2 Sheets-Sheet 1
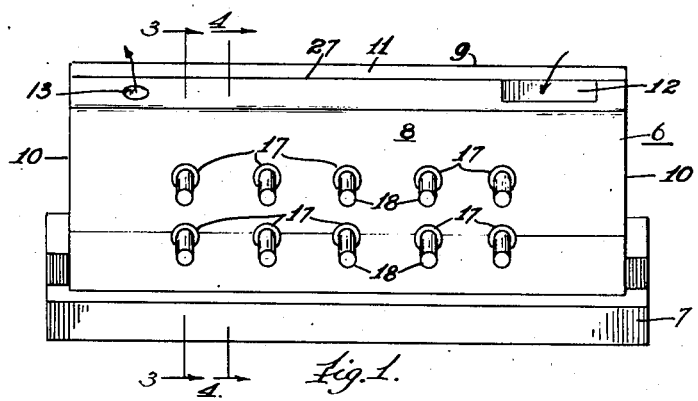
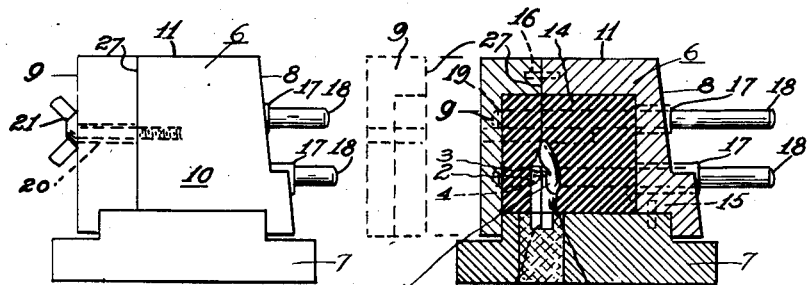
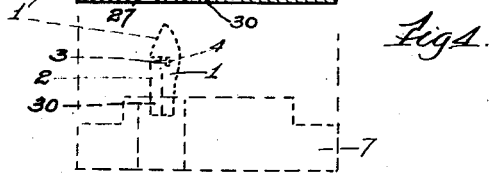
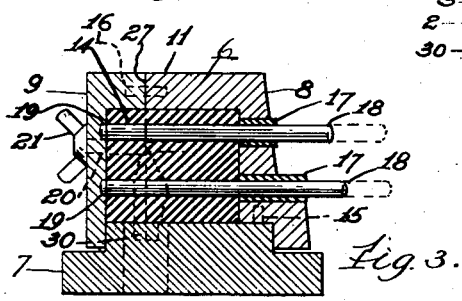
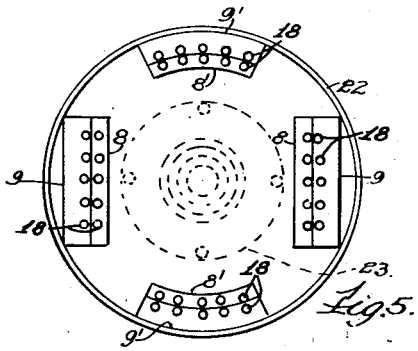
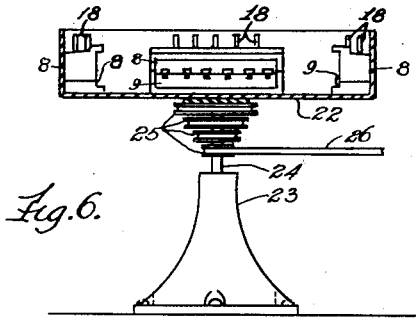
Inventor
Fred R. Felcher
by H. J. Sanders
Attorney Feb. 6, 1945. F. R. FELCHER 2,368,816
APPARATUS FOR MAKING ARTIFICIAL TEETH
Filed Sept. 4, 1942 2 Sheets-Sheet 2
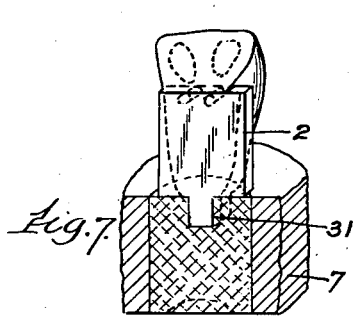
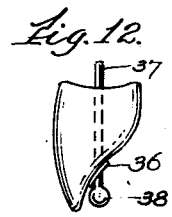
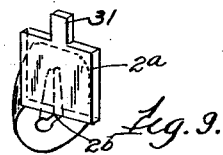
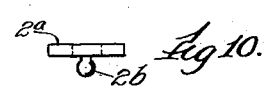
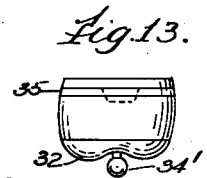
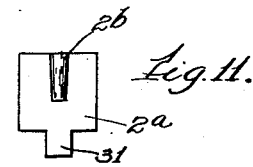
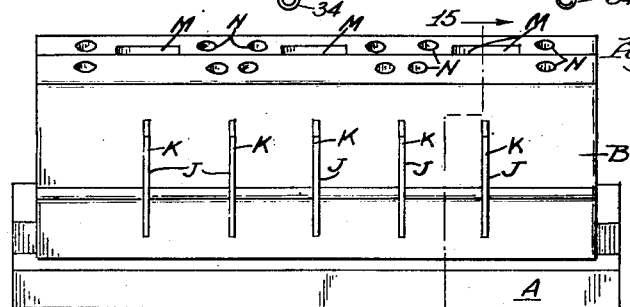
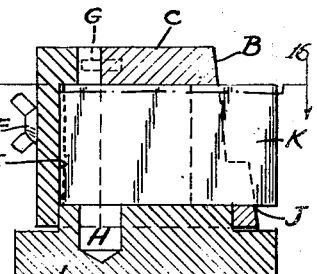
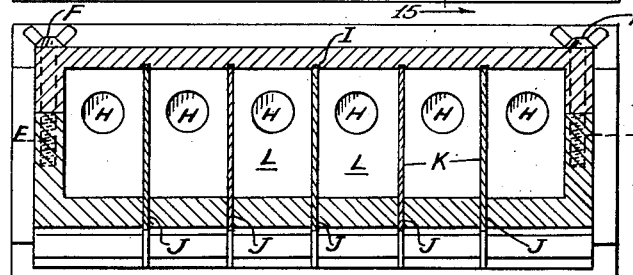
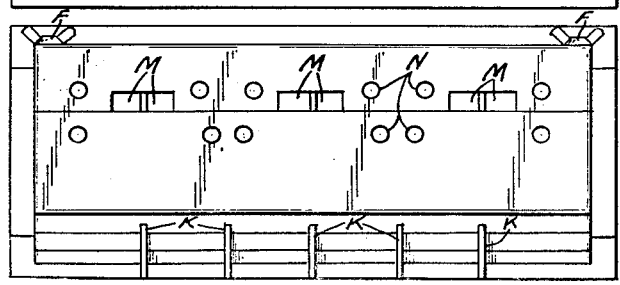
Inventor:
Fred R. Felcher
by H. J. Sanders
Attorney Patented Feb. 6, 1945

2,368,816

UNITED STATES PATENT OFFICE 2,368,816

APPARATUS FOR MAKING ARTIFICIAL TEETH

Fred R. Felcher, Chicago, Ill.

Application September 4, 1942, Serial No. 457,271

7 Claims. (Cl. 18—33)

This invention relates to improvements in molding apparatus and more particularly to means for making artificial teeth and for duplicating natural teeth, and it is applicable as well to the making of ceramic articles generally. The present application is a continuation-in-part of my copending application Serial No. 374,375, filed January 14, 1941.

In the standard method of tooth manufacture metal molds are used which consist of two or more sections and these molds contain replicas of natural teeth. Porcelain of a suitable nature and colors necessary to obtain a definite shade are then compounded and finally mixed with a binder such as a thick solution of starch or starch and gum tragacanth or other suitable vehicle, the mixing of the paste and the porcelain being brought to a thick putty-like mass. Each color is placed as desired by suitable means and the mold is then assembled and compressed in a press. Subsequently there is heat applied to the mold which tends to stiffen the binder with the porcelain, after which the mold is removed from the press, opened, and the so-called "biscuit" teeth are removed and fired in a kiln or other suitable furnace.

There are many disadvantages in the use of this method and a few are here described. Human teeth have definite shapes and definite markings that are characteristic and in many instances may be called individual. Certain of these markings are difficult to produce in their entirety by hand carving. Even if this condition could be reproduced perfectly by hand carving the abrasive character of the porcelain paste being constantly applied to the mold tends to wear away the carvings in the mold, necessitating recarving or remaking of the mold and resulting in considerable expense. In the instant manufacture the elimination of the metal mold makes it possible to reproduce artificial teeth from the enlargements of natural teeth, requiring no carving and because of the nature of the flexible material, no wear can take place such as is present when the metal molds are used and the porcelain paste is applied.

After years of experimentation and research with porcelain such as is used in the manufacture of teeth certain facts seem to stand out. For vibration it is necessary to use a porcelain of very fine mesh and the vibration to be of a nature comparable to the grain size. The finer the mesh of the porcelain used the greater the tendency to opacity as defined from translucency in tooth manufacture. It is therefore obvious that the greater the grain size used, and this size being either in full or in combination with smaller sizes, the greater is the degree of translucency, an important point in the production of teeth having a greater natural translucent effect. With the instant apparatus using the mold box and the split rubber mold or the solid rubber mold any desired grain sizes in any relative proportions may be very satisfactorily employed and these grains held in their relative positions through the process. Fine grain size does not produce an article of the strength of mixed grain sizes. In vibration where mixed grain sizes are used the tendency is to segregate the grains, the diffusion causing the possibility of weak or opaque areas. Another advantage lies in the ease of placing retaining members, pins, tubes, rods, or other means of holding the retaining members. These can be placed in teeth of different types and sizes with the retaining members so placed as to eliminate breakage of the teeth and the danger to breakage due to lever force as applied to mastication.

In the instant manufacture of artificial teeth or ceramic articles the porcelain which has been properly prepared with suitable binders and grain sizes is compacted in the mold cavities by means of centrifugal force applied by a specially constructed centrifugal machine operating at a definite number of revolutions per minute comparable to the grain sizes used. The mold box is used as described above, the split or solid rubber mold being contained in the mold box while the porcelain is being compacted by centrifugal force. The mold box may be small and contain but one or a few teeth, or it may be of sufficient size to hold a relatively large number of teeth, or it may have curved walls to fit the rim of a round centrifugal machine to obtain an even distribution of the forces applied by the motion of the machine.

Because the force of the machine would tend to cause a distortion of the flexible material in two directions, first outwardly or radially, and then laterally in the direction of movement of the machine, it is necessary to separate the mold box into cells so that each cell contains a tooth mold that is supported against the distorting effects of the two motions described. The mold box is properly prepared to hold tubes of suitable size that remain permanently in one part of the split mold box, and rods suitably fitted in these tubes so placed as to engage the opposite wall of the inside of the box. These tubes and rods may be placed in rows above each other, one, two or three rows, etc., depending upon the sizes required in the teeth or the quantity of teeth manufactured, or the judgement of the operator to prevent distortion of the mold cavities; or individually removable plates separating the cells may be employed instead of said rods and tubes. In this process for the manufacture of teeth, natural teeth are selected, then properly enlarged so as to be of the proper size after firing, allowing for the contraction of the porcelain material during the firing. The box consists of three parts, a base which is used for holding the enlarged teeth which have been duplicated in metal as individual metal models, and the retaining members held as by individual pins, rods or tubes which all have their places in the metal tooth model, or small backs which are rectangular blocks fitting against the upper portion of the metal model tooth and which is interchangeable into any part of the subsequent mold of the flexible material and the two sides of the mold box made to properly fit with the base.

As previously stated the teeth are enlarged and duplicated into master metal models. For anterior teeth pins or tubes, rods, or flat light material blocks such as aluminum blocks, these blocks having holes suitably placed for holding the retaining members such as pins, tubes, rods or other means for the manufacture of different types of teeth are placed in position on the metal master model teeth.

These are now placed in holes in the base for the reception of the master model teeth, properly aligned for subsequent cutting of the mold. The box is next assembled and the rods introduced into and through the tubes carried by the box until they contact the opposite side of the box and fit into slight depressions in the box wall; or when plates are used to divide the box they may be introduced through slots in the face of the box.

Soft rubber, synthetic rubber or other suitable flexible material is now prepared and when in the proper state it is poured into the mold box through box openings and allowed to cool. At the proper time the base of the box is removed, together with the retaining members. The rods are withdrawn into the tubes, or the plates selectively removed, to permit the proper cutting of the mold through the mold cavity dividing the flexible mold longitudinally into two parts. Both anterior and posterior teeth can be made using centrifugal force to compact the porcelain without the necessity of splitting the mold and still using the mold box and the rods and tubes, or the plates if preferred, for the prevention of distortion of the mold cavity during compacting of the porcelain material. Posterior teeth are enlarged and a duplication of the occlusal or grinding surfaces made by metal castings or other suitable methods of metal reproduction of these surfaces. The posterior metal master models with the casting properly placed on the occlusal surface are placed in position on the lower side or base of the mold box in the places made for the reception of the master model, the box assembled and the flexible mold material poured. When set, the metal tooth models are removed and the box may be prepared for cutting or splitting, or the mold may be left solid. Anterior tube teeth may be made in a solid mold by having a lingual plate with a rod attached.

Referring to the drawings:

Fig. 1 is a view of the mold box in elevation and partly in perspective.

Fig. 2 is a view of Fig. 1 in end elevation.

Fig. 3 is a vertical cross sectional view through Fig. 1 on the line 3—3.

Fig. 4 is a vertical cross sectional view through Fig. 1 on the line 4—4, the dotted lines showing certain parts in altered positions.

Fig. 5 is a plan view of the centrifugal table showing mold boxes in position thereon.

Fig. 6 is a view of Fig. 5 in elevation and partly in central vertical section.

Fig. 7 is an enlarged detail sectional view showing a tooth with back plate arranged in the mold box base before pouring the rubber material.

Fig. 8 is an unfired posterior tube tooth with occlusal plate in section and pin passing through the center of the tooth.

Fig. 9 is a modified form of interchangeable tooth with the back plate carrying the tapered lug.

Fig. 10 is a plan view of Fig. 11.

Fig. 11 is a face view of the back plate.

Fig. 12 is a side elevational view of an unfired anterior tube tooth with metal plate, rod and button the removal of which produces the lingual surface and the hole for retention.

Fig. 13 is a view of an unfired posterior denture tooth with plate for the occlusal surface and button for retention in the rubber, or other flexible material, mold during the molding process.

Fig. 14 is a view in elevation and partly in perspective of a modified form of mold box.

Fig. 15 is a vertical cross sectional view through Fig. 14 on the line 15—15.

Fig. 16 is a horizontal cross sectional view through Fig. 15 on the line 16—16, and, Fig. 17 is a top plan view of Fig. 14.

Like reference characters denote corresponding parts throughout the several views.

Apparatus is provided herein for adjustment to accommodate a high or low bite, said apparatus being here embodied in a metal plate of particular construction which is placed in the mold box and in which plate surface depressions are formed for pin or other retentions. The purpose of this plate is to hold the rods, tubes or pins while the porcelain material is being compacted into the mold cavities. This back plate 2a may also hold means of retention such as a tapered lug 2b for interchangeable porcelain teeth or as they are sometimes called, interchangeable facings, as designated in Figs. 9, 10 and 11. Another purpose of the type of back plate 2 which like the back plate 2a is flat and oblong in shape and provided with a dowel 31 but having pin depressions 3, is to facilitate the proper handling of the compacted tooth from the mold. When the compacted tooth and back plate are removed from the mold cavity a slight degree of heat applied to the back plate tends to soften the wax in the depressions in which the heads of the pins are embedded and also tends to stiffen the binding material making it a simpler matter to remove the unfired porcelain tooth from the back plate. My use of this back plate short, medium or long bite teeth are accommodated due to the fact that in the molding process the metal plate is in proper relative position on the master metal tooth, which naturally is reproduced in the porcelain. The master tooth and metal plate are assembled and placed properly in a receptacle in the lower or forming portion of the molding box, Fig. 4, and held in place by molding clay or other suitable means.

In the posterior teeth shown in Figs. 8 and 13 an occlusal plate 32 is provided having an occlusal or grinding surface made therein by casting or other suitable methods of metal reproduction, said plate in Fig. 8 carrying a pin or shank 33 passing centrally through the tooth to form an elongated perforation therein, and a button 34 for rubber retention at one end of said shank, said plate in Fig. 13 carrying a button 34' for a like purpose.

In Fig. 12 the use of an incisal plate 36 with shank or rod 37 and terminal button 38 for the making of anterior tube teeth by the centrifugal method is shown. It is a part of the present technique to subject the mold box, later to be fully described, and hence the porcelain material to centrifugal force or action, the material being in a thin condition as it is poured into the mold or cavity after the rubber is poured and the master tooth removed.

The application of centrifugal force permits a porcelain material of relatively coarse or mixed screen to be used if desired thus resulting in the formation of a translucent finished product while somewhat less subject to shrinkage than extremely ground material. The action of centrifugal force is positive and dynamic and results in the positive elimination of the water or other liquid introduced into the mold.

In preparation for the reproduction of a tooth by this method a master tooth, as shown at 1, Fig. 4 is first prepared from the tooth to be reproduced by any of the well known methods. The enlarged master tooth allows for natural shrinkage of the porcelain tooth during the firing step. The first step in my improved manufacture is to make a metal back plate 2 formed to fit in a depression in the inside or flat surface of the master tooth 1. This plate 2 may obviously be made of a length to accommodate several master teeth instead of only one. The back plate 2 may have recesses as shown at 3, Fig. 4, for receiving retaining pins 4 which may be of the single or double headed variety dependent upon the type of tooth desired or they may have retentions for interchangeable porcelain teeth as shown in Figs. 9, 10 and 11, or other means of retention used in artificial teeth, such as rods for holding heads or collars for subsequent soldering in gold clad pins, tubes, etc.

Because the metal plate does not contain or involve the lingual anatomy of the tooth as does the metal mold process the incisal lingual anatomy being reproduced here in the flexible molding material, the back plates may be formed from standard inexpensive light metal, such as aluminum strip, for lightness, giving an added advantage to the plate of an interchangeable feature for it can thus be used in different mold cavities.

The mold box in which the porcelain teeth are produced consists of a longitudinally divided main box part 6 and a base plate 7. The main box has side walls 8, 9, end walls 10 and a top 11, the larger portion thereof being formed with large and small spaced perforations 12, 13, this box description having particular reference to Figs. 1, 2, 3 and 4 but not to Figs. 14, 15, 16 and 17 which will be hereinafter described.

The back plate 2, having been made as described and the tooth attached to the same, the plate with the tooth in place is secured in position to the base plate 7, as shown in Fig. 3 and Fig. 4. As the mold box is assembled and previous to pouring the rubber mold material an anchor or dowel pin 15 carried by said base plate has been received in a corresponding depression in the side wall 8 and dowel pins 16, preferably two in number carried by wall 9, have been removably received in complementary recesses formed in said wall 8. The main box part is placed down upon the base plate and the mold of rubber, synthetic rubber, or other suitable flexible material 14 is poured into the box through the perforation 12 in the top thereof, the perforation 13 serving as an air outlet. The wall 8 is perforated and carries a plurality of tubes 17 extending therethrough and arranged in one or more horizontal rows depending upon the sizes required in the teeth, the number of teeth to be manufactured, or the judgment of the operator to prevent distortion of the mold cavities. When two or more horizontal rows of tubes are employed the members of one row are disposed in the vertical plane of the other row or rows.

Adjustably received in said tubes are rods 18, the ends thereof being preferably rounded slightly for disposition in one position in recesses 19 formed in the inner face of the side wall 9 directly opposite the perforations in the wall 8. The box sections are secured together by binder screws 20 having wing-shaped heads 21 fast thereto, said screws having bodies extending freely through perforations in the ends of the wall 9 into threaded cavities complementarily formed in the wall 8. The walls 8, 9 of the mold box may be straight and parallel to each other or may be modified to form the walls 8', 9' which are parallel to each other and curved to correspond to the wall of the rotary table 22 mounted upon a base 23 and having a shaft 24 fast upon which are a plurality of pulleys 25 of various sizes selectively driven by the belt 26 running to a driving motor, not shown.

After the rubber, synthetic rubber or other suitable flexible material has become sufficiently set and hardened the base plate 7 is removed, as denoted in dotted lines in Fig. 4 and the master metal models or teeth 1 removed together with the retaining members. The rods 18 are removed part way to allow for the proper cutting of the mold through the mold cavity and dividing the flexible mold into two parts. This may be done with a thin knife forced down through central guide slots 27 formed by the junction of the parts of the box. The two parts of the mold box may now be pulled apart, the part 9 being shown pulled away in Fig. 4, dotted lines.

By means of the improved mold box and the centrifugal method solid or uncut molds may be used. After the mold cavity has been properly prepared by proper washing the plate 2 is ready for the reception of the pins or other retaining members. In the indentations prepared for the reception of these pins some soft wax is placed and the heads of the pins embedded in the wax.

The plate is next lubricated with a suitable oil which is to prevent the adherence of the porcelain during the removal of the finished unfired tooth. The plate 2 is next placed in position in the mold cavity, the sides of the mold closed, if the cut mold method is used. Otherwise as in an uncut mold the back plate 2 is placed in proper position in the mold cavity. The prepared porcelain material which has been thinned by water or other suitable liquid is now poured into the tooth cavity 30. This material is settled and compacted in the mold cavity 30 by centrifugal force, additional porcelain being added and compacted until the mold is filled. The mold box or boxes are arranged upon the table 22 of the centrifugal machine which rotates at a definite number of revolutions per minute comparable to the grain sizes used.

Because of the nature of the flexible mold material where centrifugal force is used there is imparted a positive outward and lateral thrust tending to distort the mold cavity and the subsequent contents therein. To overcome this the mold box is divided by means of the rods 18 which extend through the tubes 17 and fit into the depressions 19. The rods 18 perforate the flexible mold material and pass between the mold cavities and relieve and strengthen said cavities from the distortive effect of the applied centrifugal force. Positive outward and lateral thrusts are also imparted to the mold boxes and their contents, the boxes being disposed upon the floor of the table upon the rods 18 or with the same uppermost as shown in Figs. 5 and 6.

The operation of the centrifugal machine forces the water to the top of the mold cavities while compacting the porcelain in the mold. The particular arrangement and position of the tubes 17 and rods 18 between the cells of the flexible mold is to positively support this mold and to retain the sections in articulate relation and to prevent distortion which would otherwise result due to centrifugal force when applied.

This process may be employed without splitting the mold and still using the mold box to prevent distortion through the medium of the tubes and rods. With either the split or one piece flexible mold the centrifugal machine is used until the porcelain material fills in the tooth cavity or cavities. The centrifugal force drives the extra water to the top where it is readily removed. It is to be noted that the plates 2, 2a are formed each with a rigid dowel member 31 at one end to permit handling of the plate. The back plate with the tooth or teeth formed on it are now removed from the mold cavity, placed in a warming oven which sets the binder producing a hard biscuit and releasing the pins from the wax. The teeth now may be fire hardened or stored for future firing.

Referring now to Figs. 14, 15, 16 and 17 only, the mold box consists of a base A, front wall B, top wall C and rear wall D. The box sections are secured together by binder screws E having heads F while dowel pins G carried by wall D are received in cavities in the wall C. The base A is formed with a plurality of cavities H for the removable reception of the master models or teeth I corresponding to the like cavities in the base 7 clearly shown in Figs. 3 and 4. The wall D is formed with vertically disposed spaced grooves I directly in line with vertical slots J formed in the front wall B, said grooves and slots being of a width and length to snugly receive the spaced removable flat plates K that are introduced through said slots through the walls B, said plates K when in position extending beyond the face of wall B so that they may be readily engaged by the fingers of the operator for insertion, removal or adjustment, said plates being entirely separate one from the other and individually and selectively removable. The recesses and slots are so arranged that when they receive said plates K the latter divide the mold into uniform one size separate cells L each of which registers with an orifice M and air holes N in the top wall C, the orifices M receiving the porcelain material to be compacted.

By means of the plates K the several cells of the flexible mold are made completely independent of each other so that one tooth at a time may be made if desired and one mold at a time removed. This independent cell structure effectually resists the distortive tendency set up by the operation of the centrifugal machine and assures most perfect tooth formation.

As many modifications of the invention will readily suggest themselves to those skilled in the art I do not limit the invention to the specific structure herein illustrated and described.

What is claimed is:

1. In apparatus for making artificial teeth and the like by the application of centrifugal force, a sectional mold box, the wall of one section being formed with depressions, the walls of another section being formed with perforations opposite said depressions, tubes in said perforations, and rods adjustably received in said tubes for removable disposition in said wall depressions.

2. In apparatus for making artificial teeth and the like, a sectional mold box, a flexible mold in said box, the wall of one section being formed with depressions arranged in rows, the depressions of one row lying in a vertical plane common to corresponding depressions of a second row, the wall of another section being formed with perforations opposite said depressions, tubes in said perforations, and rods adjustably received in said tubes for removable disposition in said depressions, said rods passing through said flexible mold.

3. In apparatus for making artificial teeth and the like, a sectional mold box, plates removably received in said box dividing the same into separate cells, and flexible molds in said cells.

4. In apparatus for making artificial teeth and the like, a sectional mold box, a wall of one section being formed with grooves, the wall of another section being formed with slots opposite said grooves, individually insertable, adjustable and removable plates received in said slots and grooves, and flexible molds in said mold box between said plates.

5. In apparatus for making artificial teeth and the like, a sectional mold box, the wall of one section being formed with grooves, the wall of another section being formed with slots opposite said grooves, individually adjustable and removable plates received in said slots and grooves dividing said mold box into separate cells, said plates extending outwardly beyond said slotted wall with respect to said grooved wall, and flexible molds in said cells.

6. In apparatus for making artificial teeth and the like by the application of centrifugal force, a sectional mold box, a flexible mold in said sectional mold box, the material forming same being of a consistency to normally become distorted when subjected to centrifugal force, and members removably engaging the sections of said sectional mold box passing through said flexible mold and supporting the latter against distortion.

7. In apparatus for making artificial teeth and the like by the application of centrifugal force, a sectional mold box, a flexible mold in said sectional mold box, the material forming same being of a consistency to normally become distorted when subjected to centrifugal force, and members passing through said flexible mold and through at least one of the sections of said sectional mold box supporting said flexible mold against distortion, said members being further retained in operative position while subjected to centrifugal force.

FRED R. FELCHER.